US006456367B2

(12) United States Patent
Miwa

(10) Patent No.: US 6,456,367 B2
(45) Date of Patent: Sep. 24, 2002

(54) RANGEFINDER APPARATUS

(75) Inventor: Yasuhiro Miwa, Omiya (JP)

(73) Assignee: Fuji Photo Optical Co. Ltd., Saitama (JP)

( * ) Notice: Subject to any disclaimer, the term of this patent is extended or adjusted under 35 U.S.C. 154(b) by 0 days.

(21) Appl. No.: 09/764,444

(22) Filed: Jan. 19, 2001

(30) Foreign Application Priority Data

Jan. 19, 2000 (JP) .................................. 2000-010858

(51) Int. Cl.⁷ .......................... G01C 3/00; G03B 13/00
(52) U.S. Cl. ..................... 356/3.04; 396/106; 396/120
(58) Field of Search ......................... 356/3.04; 396/106, 396/120

(56) References Cited

U.S. PATENT DOCUMENTS

| 4,693,597 A | * | 9/1987 | Shiomi |
| 4,855,585 A | * | 8/1989 | Nonaka |
| 6,026,246 A |   | 2/2000 | Yoshida et al. ............. 396/106 |
| 6,181,877 B1 | * | 1/2001 | Yoshida ....................... 396/106 |

FOREIGN PATENT DOCUMENTS

JP          10-274524          10/1999

* cited by examiner

Primary Examiner—Stephen C. Buczinski
(74) Attorney, Agent, or Firm—Leydig, Voit & Mayer Ltd.

(57) ABSTRACT

A rangefinder apparatus includes an infrared emitting diode projecting a light beam toward a target object several times; a position sensing device (PSD) for detecting light of the light beam reflected from the target object and outputting a signal corresponding to a distance to the target object; an auto-focus integrated circuit (AFIC) for processing the output signal of the PSD; and a CPU for outputting a control signal for the signal processing and a clamp setting signal for setting a clamp level to the AFIC, and a reset signal for resetting the AFIC to an initial state at an input terminal identical to that for the clamp setting signal. Since the clamp setting signal and the reset signal are fed to the same terminal, the cost of the signal processor can be reduced.

12 Claims, 7 Drawing Sheets

Fig.2

| NUMBER OF PULSE INPUTS | PROCESSING |
|---|---|
| 1 | 0.125nA |
| 2 | 0.25nA |
| 3 | 0.375nA |
| 4 | 0.5nA |
| 5 | 0.625nA |
| 6 | 0.75nA |
| 7 | 0.875nA |
| 8 | 1nA |
| 9 | 1.125nA |
| 10 | 1.25nA |
| 11 | 1.375nA |
| 12 | 1.5nA |
| 13 | 1.625nA |
| 14 | 1.75nA |
| 15 | AFIC RESET |

RANGEFINDER APPARATUS

BACKGROUND OF THE INVENTION

1. Field of the Invention

The present invention relates to a rangefinder apparatus for measuring the distance to a target object; and, in particular, to an active type rangefinder apparatus used in a camera or the like.

2. Related Background Art

Conventionally known as an active type rangefinder apparatus used in a camera or the like is one having light-detecting means for detecting light reflected from a target object and outputting near-side and far-side signals corresponding to the distance to the target object, comparing the far-side signal with a preset clamp signal in terms of magnitude, calculating an output ratio signal from the ratio between the greater signal determined by the comparison and the near-side signal, and converting the output ratio signal into a distance signal according to a converting expression varying depending on the value of output ratio signal as disclosed in Japanese Patent Application Laid-Open No. HEI 10-274524.

This rangefinder apparatus is aimed at obtaining rangefinding results on a par with those of a conventional system using both the light quantity and rangefinding in a short period of time without enhancing its circuit scale, so as to determine the distance to the target object uniquely and stably even when the distance is long.

Meanwhile, in a signal processing IC for signal processing and the like in this kind of rangefinder apparatus, power-on resetting is carried out at the time of starting a rangefinding routine in order to initialize data. Also, there are cases where a reset signal is fed into the signal processing IC from a microprocessor and the like.

If power supply to the signal processing IC is stopped and then power is fed again before the supply voltage becomes zero, however, then there is a case where power-on resetting is not effected in the signal processing IC. In this case, data will not be initialized in the signal processing IC, whereby there is a fear of normal rangefinding failing and malfunctions occurring.

If a reset signal is to be fed into the signal processing IC for resetting, then it is necessary to provide the signal processing IC with an input terminal for the reset signal. From the viewpoint of cutting down the cost of signal processing IC and so forth, however, it is desirable that the number of I/O terminals in the signal processing IC be smaller.

SUMMARY OF THE INVENTION

In order to overcome such technical problems, it is an object of the present invention to provide a rangefinder apparatus which can prevent malfunctions from occurring and can cut down the cost.

For achieving such an object, the rangefinder apparatus in accordance with one aspect of the present invention comprises light-projecting means for projecting a light beam toward a target object; light-receiving means for receiving reflected light of the light beam projected to the target object and outputting a signal corresponding to a distance to the target object; signal processing means for processing the output signal of the light-receiving means; and control means for outputting a control signal for the signal processing and a clamp setting signal for setting a clamp level to the signal processing means, and a reset signal for resetting the signal processing means to an initial state to an input terminal identical to that for the clamp setting signal.

According to this aspect of the present invention, the clamp setting signal and the reset signal are supplied to the same terminal of signal processing means, so that the number of input terminals installed in the signal processing means can be reduced, whereby the cost of signal processing means and, consequently, the cost of rangefinder apparatus can be cut down.

The rangefinder apparatus in accordance with another aspect of the present invention comprises light-projecting means for projecting a light beam toward a target object; light-receiving means for receiving reflected light of the light beam projected to the target object and outputting a signal corresponding to a distance to the target object; signal processing means for processing the output signal of the light-receiving means; and control means for outputting a reset signal for resetting the signal processing means to an initial state after power is supplied to the signal processing means but immediately before the power supply is stopped.

According to this aspect of the present invention, the signal processing means is reset immediately before the power supply to the signal processing means is stopped, so that a normal rangefinding routine can be carried out even when power is fed again before the supply voltage becomes a predetermined voltage or lower without power-on resetting, whereby the rangefinder apparatus can be prevented from malfunctioning.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is an explanatory chart of pulse inputs to an AFIC and contents of processing;

DESCRIPTION OF THE PREFERRED EMBODIMENTS

Figure 1:
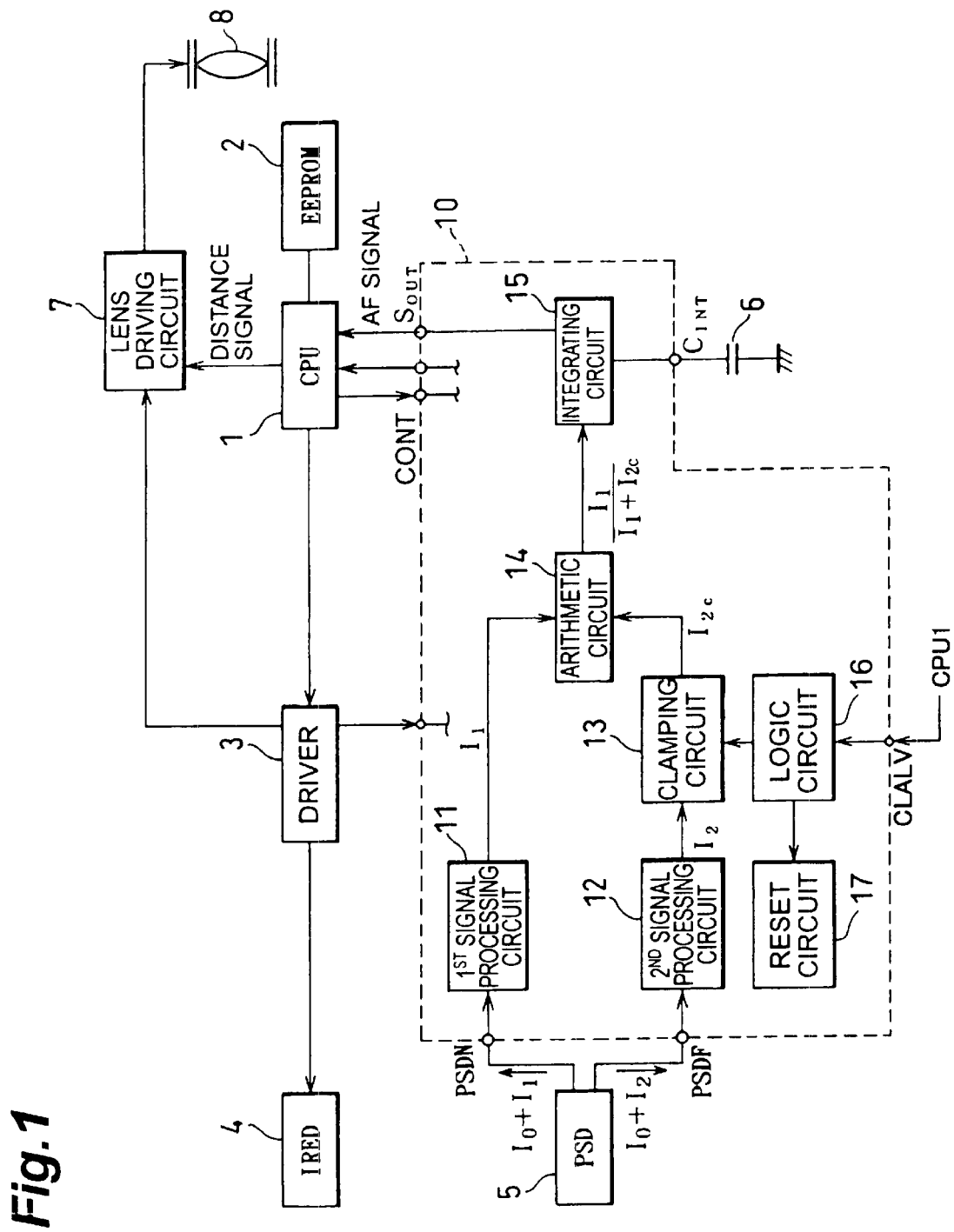
FIG. 1 is a schematic diagram of the rangefinder apparatus in accordance with a first embodiment of the present invention.

In the following, various embodiments of the present invention will be explained with reference to the accompanying drawings. Here, constituents identical to each other among the drawings will be referred to with numerals or letters identical to each other without repeating their overlapping explanations. The sizes and proportions in the drawings do not always match those explained.

First Embodiment

FIG. 1 is a schematic diagram of the rangefinder apparatus in accordance with a first embodiment.

As shown in FIG. 1, the rangefinder apparatus in accordance with this embodiment comprises a CPU 1. The CPU 1 is used for controlling the whole camera equipped with the rangefinder apparatus. Namely, the CPU 1 controls the whole camera equipped with the rangefinder apparatus according to programs and parameters which have been stored in an EEPROM 2 beforehand.

The rangefinder apparatus is provided with an IRED (infrared emitting diode) 4. The IRED 4 functions as light-emitting means for projecting a light beam to a target object by emitting light. Each IRED 4 is connected to the CPU 1 by way of a driver 3, so that its light emission is controlled by the CPU 1.

The driver 3 receives power supplied from a battery (not depicted) incorporated in the camera, and supplies the power, according to a control signal from the CPU 1, not only to the IRED 4 but also to camera components such as a lens driving circuit 7 and an auto-focus IC (hereinafter referred to as "AFIC") 10. For example, a driver IC is used therefor.

The rangefinder apparatus is also provided with a PSD (position sensing device) 5. The PSD 5 functions as light-receiving means for receiving each reflected beam of the projection light beam projected onto the target object from the IRED 4.

The rangefinder apparatus further comprises the AFIC 10. The AFIC 10 functions as signal processing means for processing output signals of the PSD 5. Operations of the AFIC 10 are controlled by the CPU 1, whereas AF signals (integrated signals) outputted from the AFIC 10 are fed into the CPU 1.

When a projection light beam, which is infrared light, is emitted from the IRED 4, this beam is projected onto the target object by way of a light-projecting lens (not depicted) disposed in front of the IRED 4. A part of the projection light beam is reflected, and is received at a certain position on the light-receiving surface of PSD 5 by way of a light-receiving lens (not depicted) disposed in front of the PSD 5. This light-receiving position corresponds to the distance to the target object. Then, the PSD 5 outputs two signals $I_1$ and $I_2$ corresponding to the light-receiving position.

The signal $I_1$ is a near-side signal which attains a greater value as the distance is shorter if the quantity of received light is constant, whereas the signal $I_2$ is a far-side signal which attains a greater value as the distance is longer if the quantity of received light is constant. The sum of signals $I_1$ and $I_2$ represents the quantity of reflected light received by the PSD 5. The near-side signal $I_1$ is fed to the PSDN terminal of AFIC 10, whereas the far-side signal $I_2$ is fed to the PSDF terminal of AFIC 10. In practice, however, respective signals including a steady-state light component $I_0$ in addition to the signals $I_1$ and $I_2$ are fed into the AFIC 10 due to external conditions.

The AFIC 10 is an integrated circuit (IC) comprising a first signal processing circuit 11, a second signal processing circuit 12, a clamping circuit 13, an arithmetic circuit 14, an integrating circuit 15, a logic circuit 16, and a reset circuit 17.

The first signal processing circuit 11 receives the signal $I_1+I_0$ outputted from the PSD 5, eliminates the steady-state light component $I_0$ included therein, and outputs the near-side signal $I_1$. The second signal processing circuit 12 receives the signal $I_2+I_0$ outputted from the PSD5, eliminates the steady-state light component $I_0$ included therein, and outputs the far-side signal $I_2$.

The clamping circuit 13 inputs the far-side signal $I_2$ outputted from the second signal processing circuit 12, compares the far-side signal $I_2$ with a preset clamp signal $I_C$, outputs the far-side signal $I_2$ as it is if the far-side signal $I_2$ is not lower than the clamping signal $I_C$, and outputs the clamping signal $I_C$ if the far-side signal $I_2$ is lower than the clamping signal $I_C$. In the following, the output signal from the clamping circuit 13 will be represented by $I_{2C}$.

The arithmetic circuit 14 receives the near-side signal $I_1$ outputted from the first signal processing circuit 11 and the output signal $I_{2C}$ outputted from the clamping circuit 13, calculates an output ratio ($I_1/(I_1+I_{2C})$), and outputs an output ratio signal representing the result thereof. This output ratio ($I_1/(I_1+I_{2C})$) represents the light-receiving position on the light-receiving surface of PSD 5, i.e., the distance to the target object.

The integrating circuit 15 receives the output ratio signal, and integrates the output ratio a number of times in cooperation with an integrating capacitor 6 connected to the $C_{INT}$ terminal of AFIC 10, thereby improving the S/N ratio. Here, the integration of output ratio to the integrating capacitor 6 is carried out as the integrating capacitor 6 in a discharged state is gradually charged according to the output ratio signal.

Then, thus integrated output ratio is outputted as an AF signal (integrated signal) from the SOUT terminal of AFIC 10. The CPU 1 receives the AF signal outputted from the AFIC 10, carries out a predetermined arithmetic operation so as to convert the AF signal into a distance signal, and sends out the distance signal to the lens driving circuit 7. The lens driving circuit 7 operates a taking lens 8 so as to place it in focus according to the distance signal.

The logic circuit 16 is a circuit for carrying out a logical operation, and is connected to the CLALV terminal, which is an input terminal of the AFIC 10. By way of the CLALV terminal, it inputs pulse signals outputted from the CPU 1. The logic circuit 16 comprises a 4-bit binary counter circuit constituted by a D flip-flop, for example, and so forth. It outputs a signal to the clamping circuit 13, in response to a pulse input of pulse signals outputted from the CPU 1, so as to set a clamp current and the clamp signal $I_C$, and resets the AFIC 10.

In the logic circuit 16, an arithmetic circuit is assembled so as to output a signal to one of the clamping circuit 13 and reset circuit 17 in response to the number of pulse inputs of pulse signals from the CPU 1.

Specifically, as shown in FIG. 2, the logic circuit 16 outputs signals causing the clamp current to become 0.125 nA, 0.25 nA, 0.375 nA, 0.5 nA, and 0.625 nA to the clamping circuit 13 when pulse signals composed of 1 pulse, 2 pulses, 3 pulses, 4 pulses, and 5 pulses are inputted thereto, respectively.

Also, the logic circuit 16 outputs signals causing the clamp current to become 0.75 nA, 0.875 nA, 1.0 nA, 1.125 nA, 1.25 nA, 1.375 nA, 1.5 nA, 1.625 nA, and 1.75 nA to the clamping circuit 13 when pulse signals composed of 6 pulses, 7 pulses, 8 pulses, 9 pulses, 10 pulses, 11 pulses, 12 pulses, 13 pulses, and 14 pulses are inputted thereto, respectively.

Further, the logic circuit 16 outputs a signal for resetting the AFIC 10 to the reset circuit 17 when a pulse signal composed of 15 pulses is inputted.

When the logic circuit 16 inputs pulse signals having different numbers of pulses byway of a single CLALV terminal, not only a clamp current for determining a clamp level can be set, but also the AFIC 10 can be reset. At this time, the pulse signal outputted from the CPU 1 functions as a clamp setting signal and a reset signal.

The reset circuit 17 is a circuit for resetting each item of data in the AFIC 10 to its initial state, and is actuated in response to the output signal of logic circuit 16.

Figure 3:
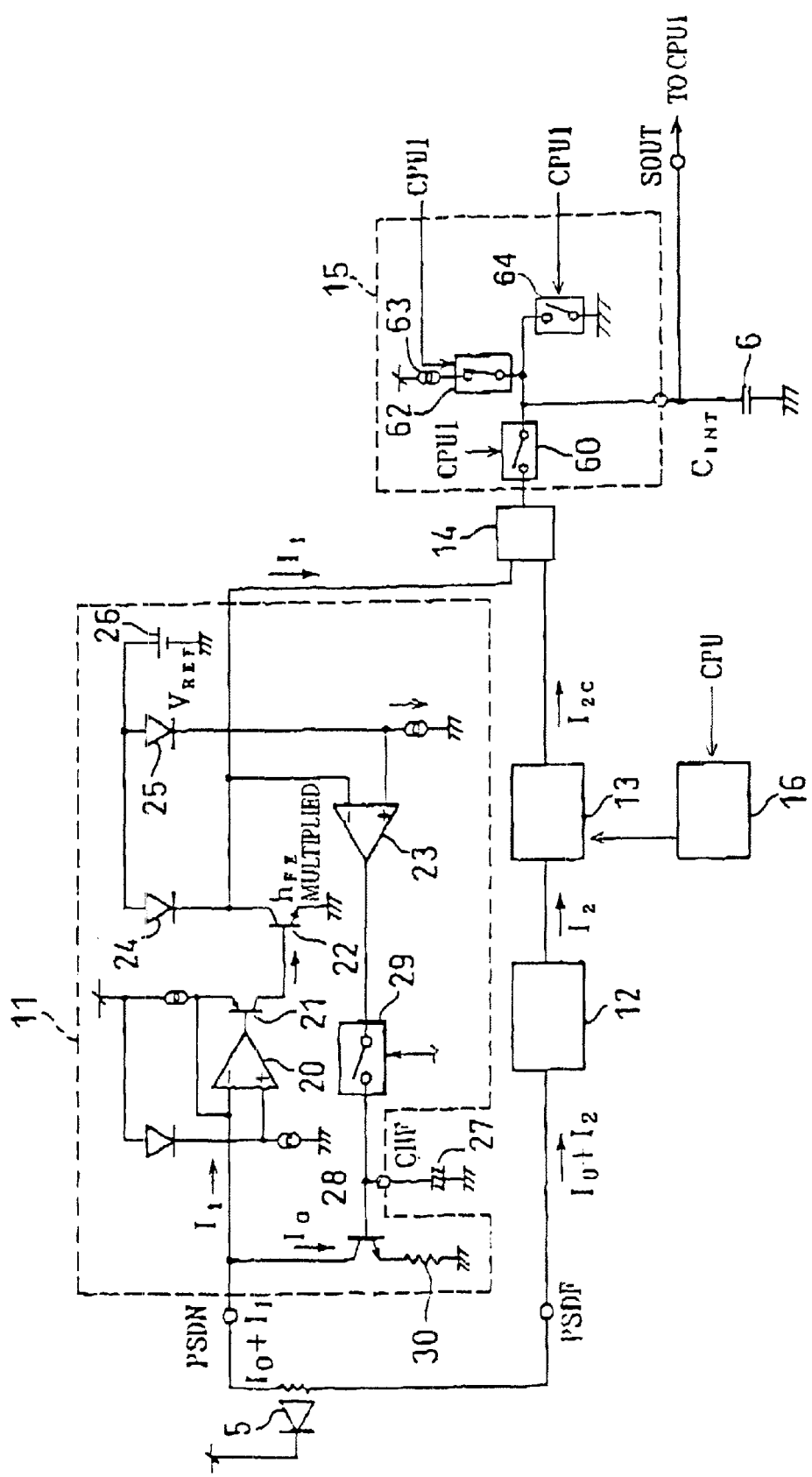
FIG. 3 is an explanatory diagram of the signal processing circuit and the like in the rangefinder apparatus of FIG. 1.

FIG. 3 is a view showing a specific configuration of the first signal processing circuit 11 and integrating circuit 15. The second processing circuit 12 has a circuit configuration similar to that of the first signal processing circuit 11.

As shown in FIG. 3, the first signal processing circuit 11 inputs the near-side signal $I_1$ and steady-state light component $I_0$ outputted from the PSD 5, eliminates the steady-state light component $I_0$, and outputs the near-side signal $I_1$. The current $(I_1+I_0)$ outputted from the shorter-distance-side terminal of PSD 5 is fed to the "−" input terminal of an operational amplifier 20 in the first signal processing circuit 11 by way of the PSDN terminal of AFIC 10. The output terminal of operational amplifier 20 is connected to the base terminal of a transistor 21, whereas the collector terminal of transistor 21 is connected to the base terminal of a transistor 22. The "−" input terminal of an operational amplifier 23 is connected to the collector terminal of transistor 22, and the cathode terminal of a compression diode 24 is also connected to this collector terminal. The cathode terminal of a compression diode 25 is connected to the "+" input terminal of operational amplifier 23, whereas a first reference power source 26 is connected to the respective anode terminals of compression diodes 24 and 25.

Also, a steady-state light eliminating capacitor 27 is externally attached to the CHF terminal of AFIC 10. The steady-state light eliminating capacitor 27 is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of steady-state light eliminating transistor 28 is connected to the "−" input terminal of operational amplifier 20, whereas the emitter terminal of transistor 28 is connected to one end of a resistor 30 whose other end is grounded.

The integrating circuit 15 in FIG. 3, on the other hand, comprises the integrating capacitor 6 externally attached to the $C_{INT}$ terminal of AFIC 10. The integrating capacitor 6 is connected to the output terminal of arithmetic circuit 14 by way of a switch 60 and to a constant current source 63 by way of a switch 62, and is grounded by way of a switch 64. The switches 60, 62, and 64 are controlled by control signals from the CPU 1.

Figure 4:
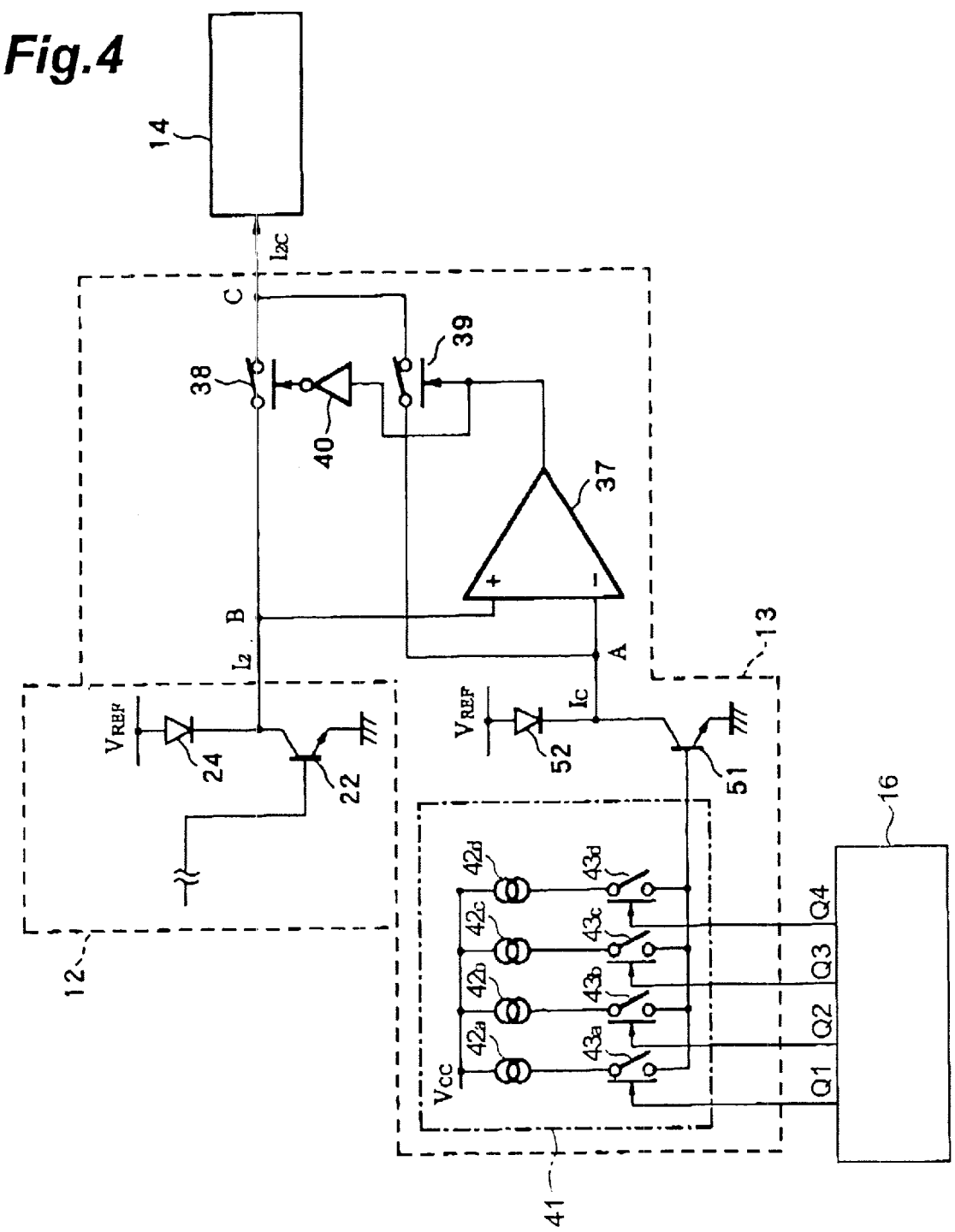
FIG. 4 is an explanatory diagram of the clamping circuit and the like in the rangefinder apparatus of FIG. 1.

FIG. 4 is a view showing a specific configuration of the clamping circuit 13 in the AFIC 10.

As shown in FIG. 4, the clamping circuit 13 comprises a comparator 37 for determining the level of far-side signal $I_2$. The "+" terminal of comparator 37 is connected to the collector terminal of transistor 22 in the second signal processing circuit 12 and is connected to the input terminal of arithmetic circuit 14 by way of a switch 38. On the other hand, the "−" terminal of comparator 37 is connected to the collector terminal of a transistor 51 and the cathode terminal of a compression diode 52 as with the transistor 22 and compression diode 24 connected to the "+" terminal, and is connected to the input terminal of arithmetic circuit 14 by way of a switch 39.

A clamp current source 41 is connected to the base terminal of transistor 51. In the clamp current source 41, a constant current source 42a and a switch 43a are connected in series, a constant current source 42b and a switch 43b are connected in series, a current source 42c and a switch 43c are connected in series, and a current source 42d and a switch 43d are connected in series, whereas the switches 43a to 43d are connected to the base terminal of transistor 51 on their other end side.

As the constant current sources 42a, 42b, 42c, and 42d, those outputting constant current values of 0.125 nA, 0.25 nA, 0.5 nA, and 1.0 nA, respectively, are employed, for example.

The switches 43a to 43d open and close under the control of their respective signals Q1 to Q4 outputted from the logic circuit 16. To the base terminal of transistor 51, the clamp current source 41 feeds a clamp current which is the sum of respective currents from the constant current sources corresponding to thus closed switches. This clamp current becomes a base current for the transistor 51, and a collector potential corresponding to the magnitude of base current is fed to the "−" input terminal of comparator 37. The clamp current is appropriately set when making the rangefinder apparatus.

The output terminal of comparator 37 is connected to the switch 39, so that an output signal of the comparator 37 is fed to the switch 39. Also, the output terminal of comparator 37 is connected to the switch 38 by way of an inverter 40, so that the output signal of comparator 37 is fed to the switch 38 as being inverted. Hence, the switches 38 and 39 have such a relationship therebetween that if one of them is turned ON by the output signal of comparator 37, then the other is turned OFF.

Operations of the rangefinder apparatus in accordance with this embodiment will now be explained.

Figure 5:
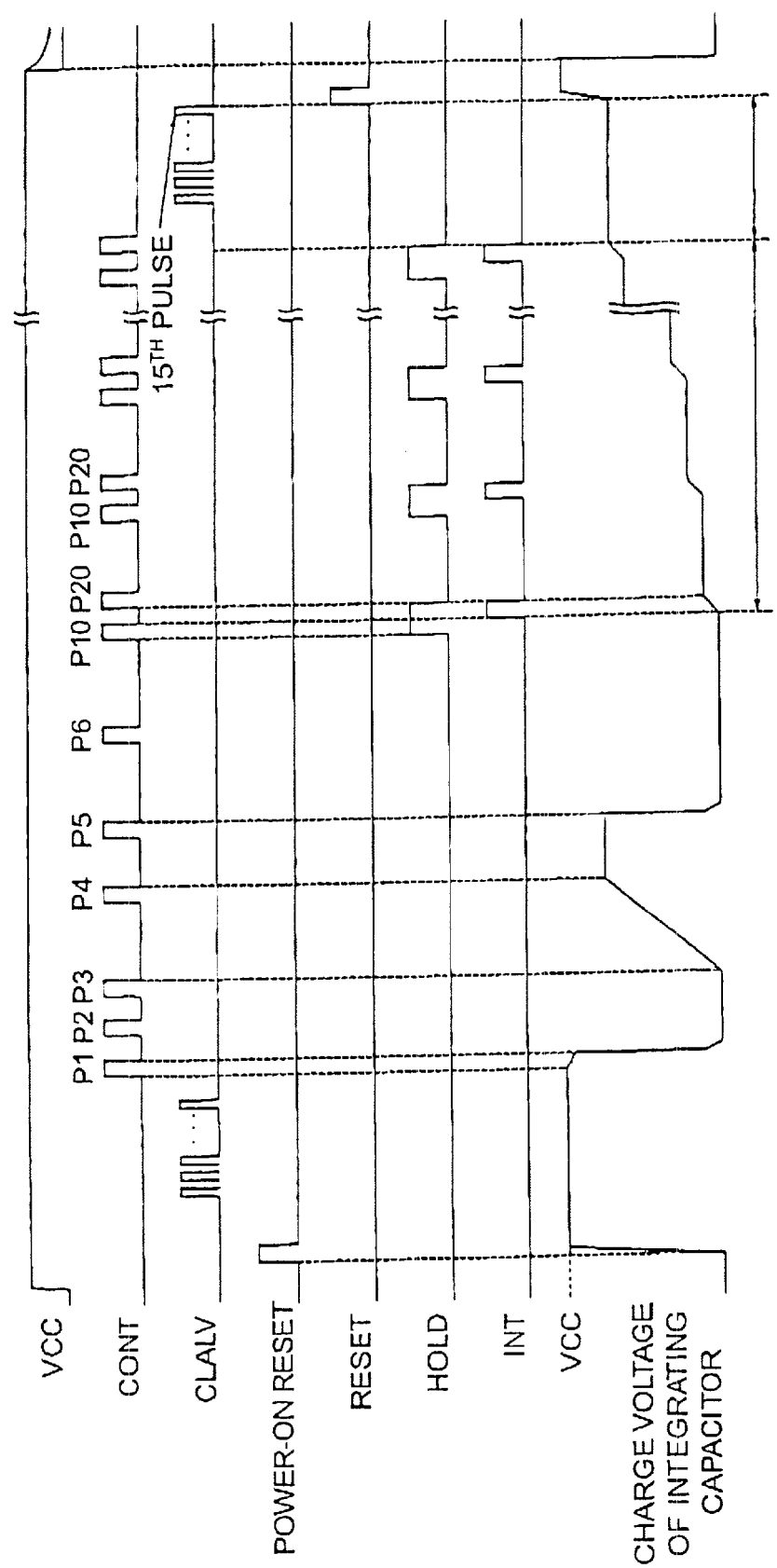
FIG. 5 is a timing chart of the rangefinder apparatus in accordance with the first embodiment during its operations.

FIG. 5 is a timing chart concerning operations of the rangefinder apparatus.

When the shutter of camera is pressed, a rangefinding routine is started, whereby a supply voltage $V_{cc}$ is supplied from the driver 3 to the AFIC 10 as shown in FIG. 5. Substantially at the same time with the power supply, power-on resetting is carried out in the AFIC 10, whereby preliminary charging is started in the integrating capacitor 6.

Then, a pulse signal is fed as a clamp setting signal to the CLALV terminal of AFIC 10, whereby a plurality of pulses are inputted. In response to the number of pulse inputs, a clamp current and a clamp signal level are set in the clamp circuit 13. Subsequently, a control signal is fed to the CONT terminal of AFIC 10. Namely, after 6 pulses P1 to P6 are fed to the CONT terminal, pulses P10, P20 for an integrating operation are repeatedly inputted thereto.

The input of pulse P1 completes the preliminary charging of integrating capacitor 6. Upon the input of pulse P3, an integrating operation for correction is started. The integration for correction is carried out by causing a constant current to flow through the integrating capacitor 6 for a predetermined period of time.

The input of pulse P4 stops the integrating operation for correction. The charging voltage of the integrating capacitor 6 is A/D-converted, and the resulting value is read into the CPU 1. CPU 1 calculates the capacitance of the integrating capacitor 6 from the A/D-converted voltage value. The correction of the rangefinding results according to the calculated capacitance improves the rangefinding accuracy.

The input of pulse P5 causes the integrating capacitor 6 to be discharged.

An integrating operation is carried out each time pulses P10, P20 are inputted, whereby the integrating capacitor 6 is charged according to the output ratio $(I_1/(I_1+I_{2C}))$. If a predetermined number of integrating operations are completed, then a pulse signal is fed as a reset signal to the CLALV terminal of AFIC 10. Namely, 15 pulses are inputted to the CLALV terminal, the logic circuit 16 outputs a signal to the reset circuit 17 in response to the input of 15 pulses, and the reset circuit 17 is actuated so as to reset the AFIC 10. Upon this resetting, various kinds of data in the AFIC 10 attain their initial states.

Then, the power supply to the AFIC 10 is stopped ($V_{cc}$ off), whereby the rangefinding routine ends.

As in the foregoing, since a clamp setting signal and a reset signal are fed to the CLALV terminal of AFIC 10, the number of input terminals installed in the AFIC 10 can be reduced in the rangefinder apparatus in accordance with this embodiment. Therefore, the cost of AFIC 10 which is signal processing means and, consequently, the cost of the whole rangefinder apparatus can be cut down.

Also, since the AFIC 10 is reset when the rangefinding operation (integrating operation) ends, a normal rangefinding routine can be carried out even when a supply voltage is fed again before it becomes a predetermined voltage or lower without power-on resetting, whereby the rangefinder apparatus can be prevented from malfunctioning.

Second Embodiment

The rangefinder apparatus in accordance with a second embodiment will now be explained.

The rangefinder apparatus in accordance with this embodiment has a configuration substantially the same as that of the rangefinder apparatus in accordance with the first embodiment, but differs therefrom in that a reset signal is fed from the CPU 1 acting as control means to the AFIC 10 acting as signal processing means immediately before the power supply to the AFIC 10 is stopped.

Figure 6:
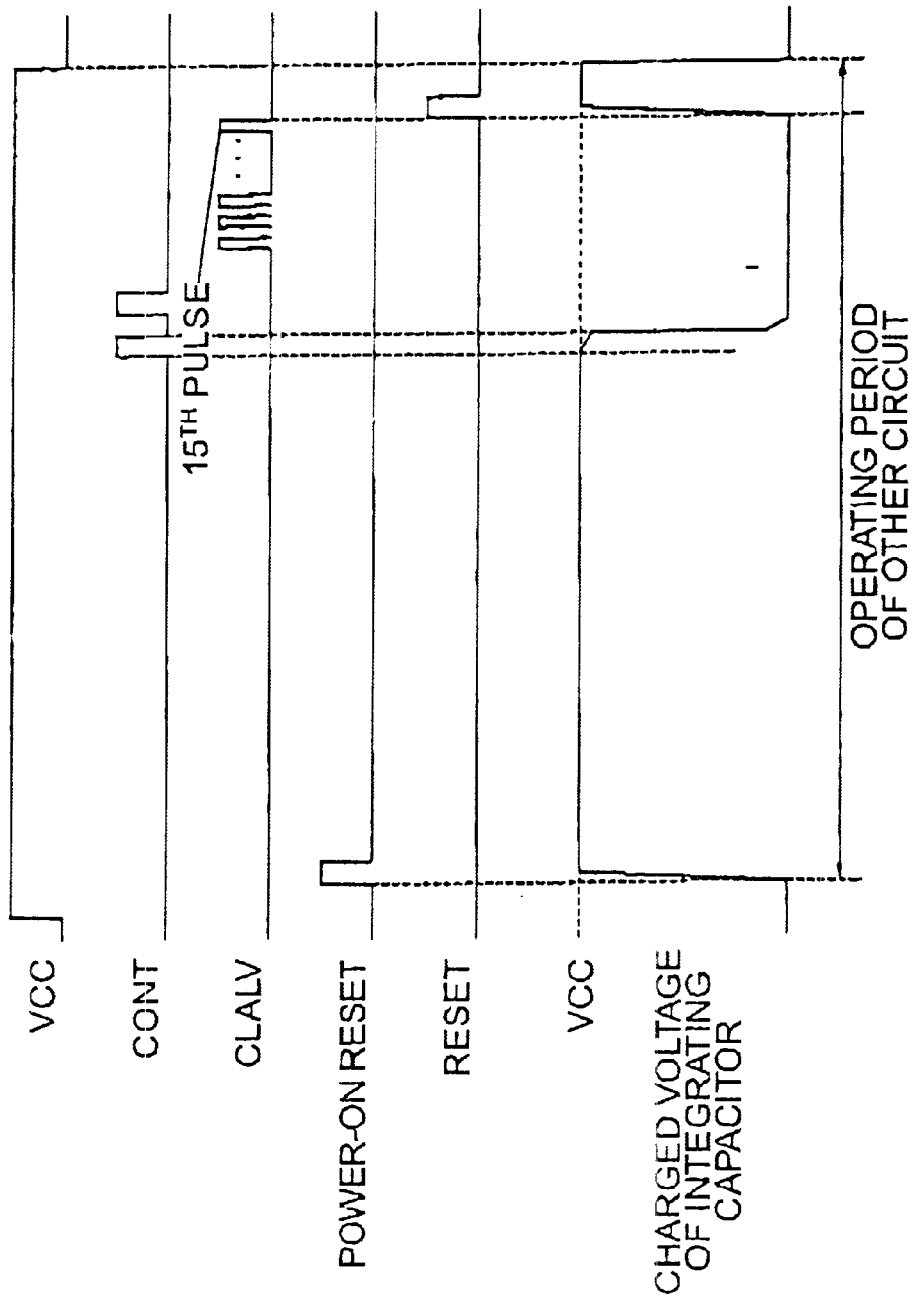
FIG. 6 is a timing chart of the rangefinder apparatus in accordance with a second embodiment during its operations.

FIG. 6 is a timing chart concerning operations of the rangefinder apparatus.

When a zooming operation or the like is carried out in FIG. 1, a control signal is outputted from the CPU 1 to the driver 3, whereby a supply voltage is supplied from the driver 3 to the lens driving circuit 7. Here, as shown in FIG. 6, the supply voltage is similarly supplied to the AFIC 10 ($V_{cc}$ in FIG. 6). In response to this power supply, power-on resetting is carried out in the AFIC 10.

When the zooming operation or the like is completed, the power supply to the AFIC 10 is stopped along with the stopping of power supply to the lens driving circuit 7. Immediately before stopping the power supply, however, a pulse signal is fed as a reset signal from the CPU 1 to the CLALV terminal of AFIC 10. Namely, 15 pulses are inputted to the CLALV terminal, and the logic circuit 16 outputs a signal to the reset circuit 17 in response to the input of 15 pulses, whereby the reset circuit 17 is actuated so as to reset the AFIC 10. Upon the resetting, various kinds of data in the AFIC 10 attain their initial states.

Here, "immediately before" stopping the power supply refers to a period after the completion of operations of circuits other than the AFIC 10 and the like until when the power supply to the AFIC 10 is stopped.

Since the AFIC 10 is reset immediately before the power supply to the AFIC 10 is stopped, a normal rangefinding routine can be carried out in the rangefinder apparatus in accordance with this embodiment even when a supply voltage is fed again before it becomes a predetermined voltage or lower without power-on resetting, whereby the rangefinder apparatus can be prevented from malfunctioning.

Third Embodiment

Although the rangefinder apparatus in accordance with the first and second embodiments preforms the rangefinding operation once, the rangefinder apparatus in accordance with the present invention is not restricted thereto.

The rangefinder apparatus may preform the rangefinding operation many times and calculate the distance to the target object according to results of the rangefinding operations.

Here, "rangefinding operation" refers to an operation in which IRED 4 projects light, PSD 5 receives light, and discharges to the integrating capacitor 6 are repeated a predetermined number of times.

Figure 7:
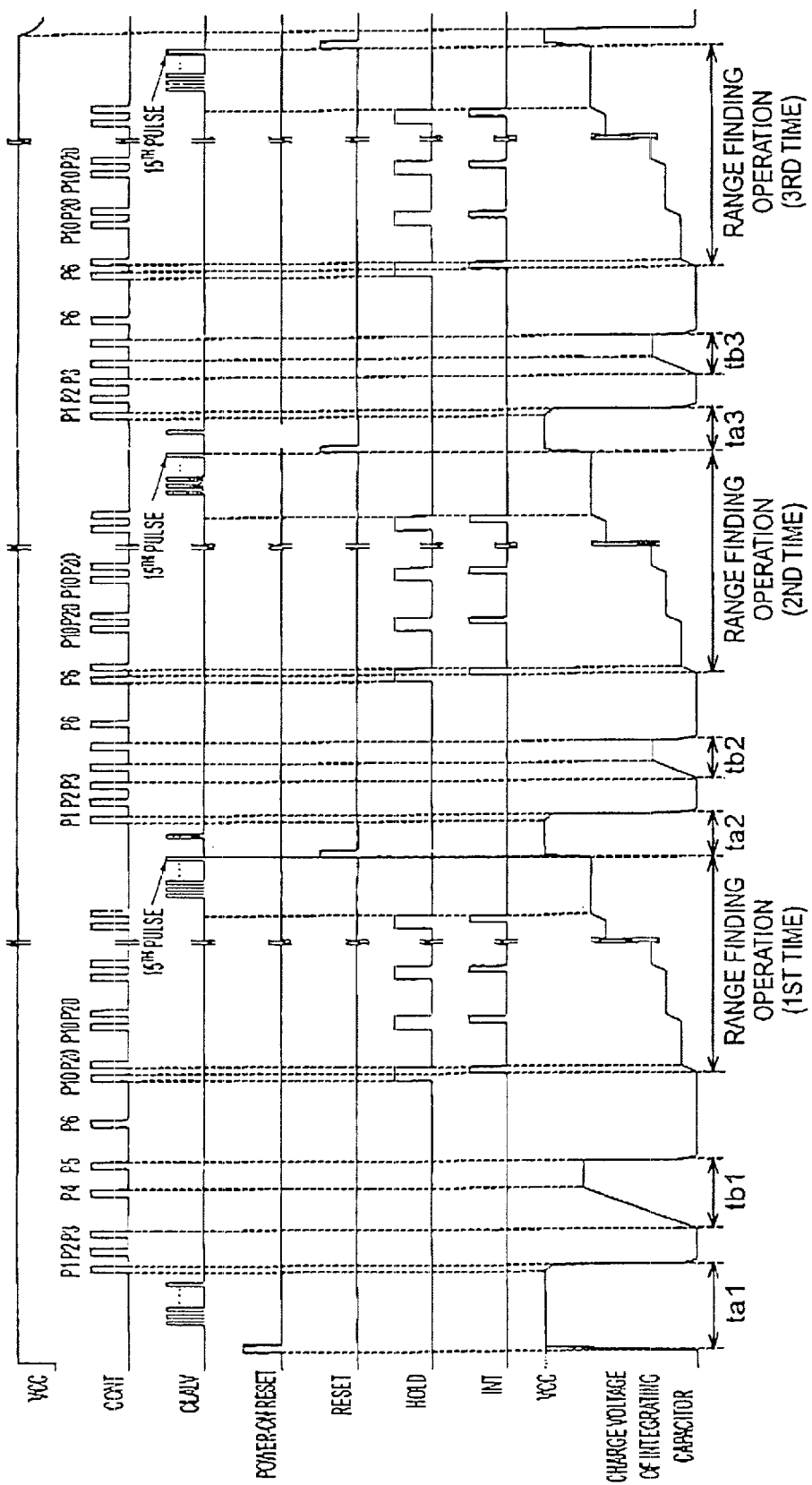
FIG. 7 is a timing chart of the rangefinder apparatus in accordance with a third embodiment during its operations.

FIG. 7 is a timing chart showing rangefinding operations carried out three times. As shown in FIG. 7, when the rangefinding operations are carried out multiple times, charging times ta2, ta3 for integrating capacitor 6 in the second and subsequent rangefinding operations are desirably shorter than charging time ta1 of integrating capacitor 6 in the first rangefinding operation.

Further, integration times tb2, tb3 for correction in the second and subsequent rangefinding operations are desirably shorter than integration time tb1 for correction in the first rangefinding operation.

As in the foregoing, by shortening the charging time and the integration time for correction in the second and later rangefinding operations, the rangefinder apparatus in accordance with this embodiment can reduce the time required for rangefinding and decrease a time lag.

Also, by carrying out the rangefinding operations multiple times and by taking an average of the rangefinding results, the rangefinding accuracy can be improved.

Further when the rangefinding operations are carried out multiple times, the results of the first integration for correction can be used during the second and later rangefinding operations. Consequently correction integration during the second and later rangefinding operations may be omitted. In the rangefinder apparatus in accordance with this embodiment, control processing operations are carried out according to pulses in the control signal, therefore time for integration for correction in the second and later rangefinding operations is reduced.

The rapid charging (charging at a time ta1 in FIG. 7) of the integrating capacitor 6 in the first rangefinding operation reduces the dielectric absorption of integrating capacitor 6. Consequently the second and later rangefinding operations may omit the rapid charging step. In the rangefinder apparatus in accordance with this embodiment, control processing operations are carried out according to pulses in the control signal, therefore time for rapid charging in the second and later rangefinding operations is reduced.

As explained in the foregoing, when a clamp setting signal and a reset signal are fed to the same terminal of signal processing means in the present invention, the number of input terminals installed in the signal processing means can be reduced, whereby the cost of signal processing means and, consequently, the cost of rangefinder apparatus can be cut down.

When the signal processing means is reset immediately before the power supply to the signal processing means is stopped, on the other hand, a normal rangefinding routine can be carried out even when a supply voltage is fed again before it becomes a predetermined voltage or lower without power-on resetting, whereby the rangefinder apparatus can be prevented from malfunctioning.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

light-projecting means for projecting a light beam toward a target object located at a distance to be determined;

light-detecting means for detecting light of the light beam reflected from the target object and outputting a signal corresponding to the distance to the target object;

signal processing means for processing the signal output by said light-detecting means; and control means for outputting a control signal for said signal processing means, a clamp setting signal for setting a clamp level of said signal processing means via an input terminal, and a reset signal for resetting said signal processing means to an initial state via the input terminal which is identical to the input terminal for the clamp setting signal.

2. A rangefinder apparatus comprising:

light-projecting means for projecting a light beam toward a target object located at a distance to be determined;

light-detecting means for detecting light of the light beam reflected from the target object and outputting a signal corresponding to the distance to the target object;

signal processing means for processing the output signal of said light-detecting means; and control means for outputting a reset signal for resetting said signal processing means to an initial state, wherein said control means controls supplying power to said light-projecting means and said signal processing means and determines the distance to the target object and, thereafter, controls stopping of supplying of power to said light-projecting means and said signal processing means and outputs the reset signal immediately before stopping the supplying of power to said light-projecting means and said signal processing means.

3. The rangefinder apparatus according to claim 1, wherein said signal processing means includes a signal processing IC.

4. The rangefinder apparatus according to claim 1, wherein said light-projecting means projects infrared light toward the target object.

5. The rangefinder apparatus according to claim 1, wherein said light-detecting means is a position sensing device.

6. The rangefinder apparatus according to claim 2, wherein said signal processing means includes a signal processing IC.

7. The rangefinder apparatus according to claim 2, wherein said light-projecting means projects infrared light toward the target object.

8. The rangefinder apparatus according to claim 2, wherein said light-detecting means is a position sensing device.

9. A rangefinder apparatus comprising:

light-projecting means for projecting a light beam toward a target object located at a distance to be determined;

light-detecting means for detecting light of the light beam reflected from the target object and outputting a signal corresponding to the distance to the target object;

signal processing means for processing the signal output by said light-detecting means and including a clamping circuit having an externally controllable clamping level for processing the signal output and a resetting terminal for receiving a reset signal for resetting said signal processing means to an initial state; and control means outputting a control signal for controlling said signal processing means, a clamping level setting signal for setting the clamping level of said clamping circuit through said resetting terminal, and the reset signal for resetting said signal processing means through said resetting terminal, wherein said signal processing means includes a logic circuit connected between said clamping circuit and said resetting terminal and discriminating between the reset signal applied to said resetting terminal for resetting said signal processing means and the clamping level setting signal for controlling the clamping level of said clamping circuit.

10. The rangefinder apparatus according to claim 9, wherein said signal processing means includes a signal processing IC.

11. The rangefinder apparatus according to claim 9, wherein said light-projecting means projects infrared light toward the target object.

12. The rangefinder apparatus according to claim 9, wherein said light-detecting means is a position sensing device.

* * * * *